United States Patent [19]

Peiffer

[11] 4,378,816

[45] Apr. 5, 1983

[54] HYDRAULIC PRIORITY VALVE

[75] Inventor: Joachim Peiffer, Meerbusch, Fed. Rep. of Germany

[73] Assignee: Integral Hydraulik & Co., Dusseldorf, Fed. Rep. of Germany

[21] Appl. No.: 218,406

[22] Filed: Dec. 19, 1980

[30] Foreign Application Priority Data

Dec. 24, 1979 [DE] Fed. Rep. of Germany ....... 2952369

[51] Int. Cl.³ ............................................ G05D 16/10
[52] U.S. Cl. ..................................... 137/116; 60/418; 60/422; 137/118
[58] Field of Search ......................... 60/413, 418, 422; 137/115, 116, 118

[56] References Cited

U.S. PATENT DOCUMENTS

| | | | |
|---|---|---|---|
| 2,846,850 | 8/1958 | Hall | 137/118 X |
| 3,628,558 | 12/1971 | Bahl | 137/118 |
| 4,014,360 | 3/1977 | Adams | 60/422 X |
| 4,192,337 | 3/1980 | Alderson | 60/413 X |
| 4,244,390 | 1/1981 | Kervagoret | 60/418 X |

FOREIGN PATENT DOCUMENTS

| | | | |
|---|---|---|---|
| 1060211 | 6/1959 | Fed. Rep. of Germany | 137/118 |
| 558700 | 3/1957 | Italy | 137/118 |

Primary Examiner—Robert G. Nilson
Attorney, Agent, or Firm—Holman & Stern

[57] ABSTRACT

A hydraulic priority switch for preferential feeding of a low consumption primary loop in fluid communication with a hydraulic reservoir which is chargeable from a pressure medium source via a flow control means, against a non-preferential secondary loop which can be switched in with the aid of a priority value when said primary loop is sufficiently pressurized, said hydraulic priority switch having protecting means for protecting both loops from excess pressure comprising a pressure-limiting valve which functions to make an outlet flow path available when pressure is excessive.

7 Claims, 1 Drawing Figure

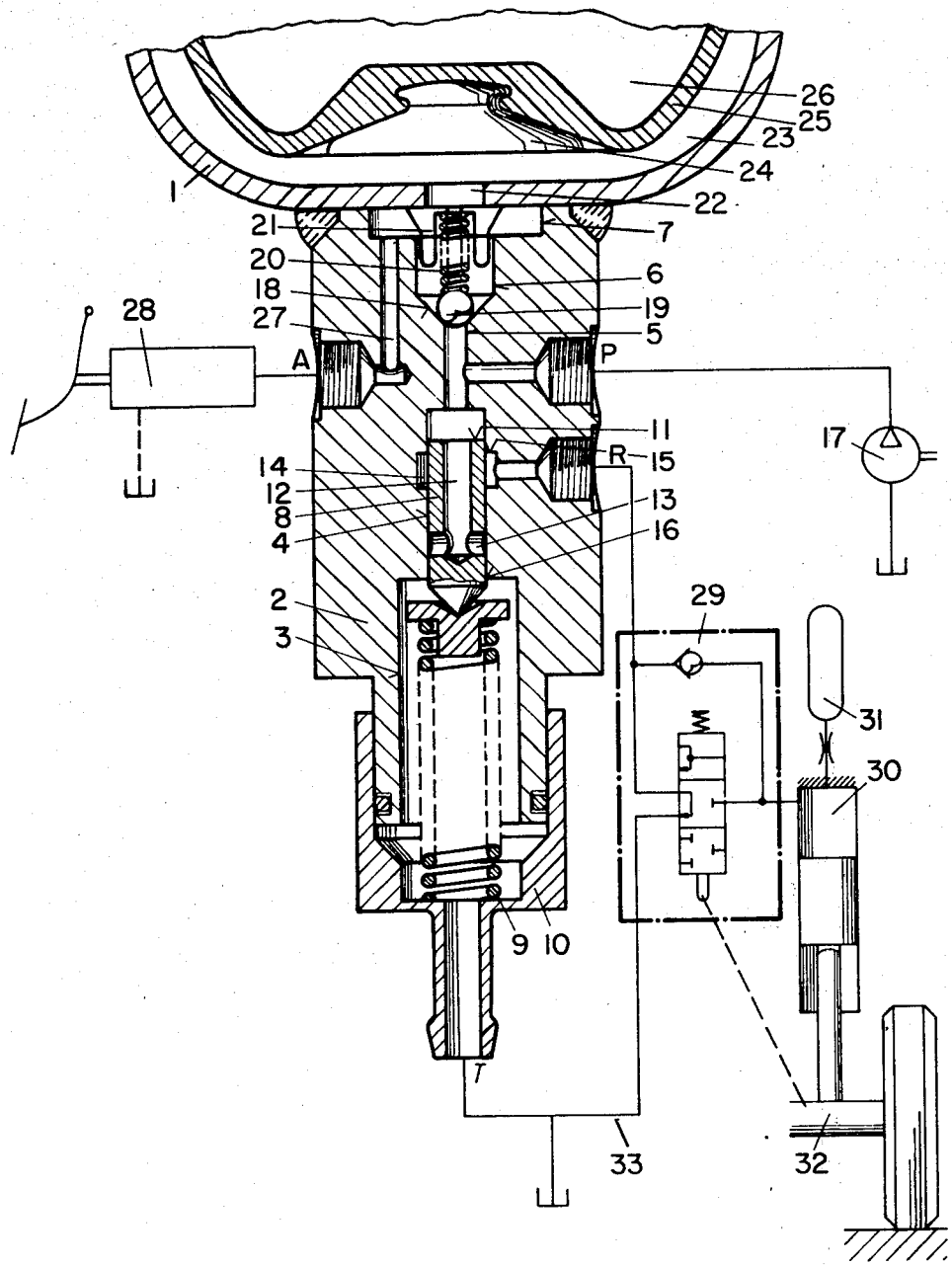

HYDRAULIC PRIORITY VALVE

BACKGROUND OF THE INVENTION

1. Field of the Invention

This invention relates to hydraulic priority valves for preferential direction of fluid pressure, particularly for hydraulic devices on vehicles.

2. Description of the Prior Art

It is known to install priority valves when, on reasons of operating safety or reliability or in order to achieve a specific schedule of functions, one of two or more consuming devices must be suppled with pressure medium before an additional consuming device is connected to the source of that pressure medium. An example from the standpoint of operating safety or reliability might be a vehicle wherein a power brake and a level control are fed from a single pump. Clearly the brake, which is critically important to safety, must be given priority. An example from the standpoint of a schedule of functions might be the operating sequence (a) hydraulic gripping of a workpiece and (b) advance of a tool. Here clearly, the advance should only occur following the gripping.

A known priority valve (German laid-open application No. 23 56 235) employs a bypass valve which is hydraulically servo-controlled. The pressure medium flows from the pressure medium source through a check valve to a hydraulic accumulator and to the preferred consuming device. The pressure in the hydraulic accumulator serves as the control pressure for a preliminary control piston and an active surface of a main control piston, with the second active surface of said main control piston being relieved from or supplied with the control pressure depending on the state of charging of the hydraulic accumulator. The main control piston conveys the pressure medium stream to the non-preferred consuming device when the hydraulic reservoir is adequately charged.

The pressure-limiting valve may, at various times, be exposed to the pressure of the hydraulic accumulator. Such an arrangement is indeed functionally very reliable and is adequate for many applications. If, however, the preferred consuming device is required always to operate with the same pressure to the extent possible, as is desired for example in the case of a power brake with an accumulator, this cannot be brought about by a bypass valve. This stems from the fact that bypass valves ordinarily have switching-pressure differentials.

Accordingly the underlying problem of the invention is to devise a hydraulic priority valve of a suitable type wherein the consuming device which is preferentially supplied, and is in particular discontinuously operated, has the same pressure level available at all times. This pressure level should be, in particular, independent of any consumption on the part of other consuming devices. Said valve should be simple and inexpensive, with a minimum of parts, and in particular, should be suited to mass production. The installation space required should be small enough so that the entire assembly can be constructed as an attachment to a hydraulic accumulator.

SUMMARY OF THE INVENTION

This invention provides a hydraulic priority valve for preferential feeding of a low consumption primary loop in fluid communication with a hydraulic accumulator which is chargeable from a pressure medium source via a flow control means (such as a check valve), against a non-preferential secondary loop which can be switched in with the aid of a priority valve when said primary loop is sufficiently pressurized; said hydraulic priority valve having protecting means for protection of both loops from excess pressurization, the protecting means preferably comprising a pressure-limiting valve which functions to make an outlet flow path available when pressurization is excessive.

In particular, this invention provides an improvement in the above hydraulic priority valve wherein: the priority valve is a sequence valve in a structural module with the pressure-limiting valve, having a moveable valve element means (preferably a slideable control piston) with a hydraulic fluid interface surface (preferably the control piston end face and blind hole), which valve element acts against the force of a resistance means (preferably a return spring), said valve element being permanently pressurized from the pressure medium source (preferably hydraulic fluid); whereby, when a first given pressure is attained a first pressure medium flow path is opened from a pressure connection which is upstream of the flow control means (preferably a check valve) to a first consuming device connection which is linked to the secondary loop, said first pressure medium flow path being activated by the movement of the valve element (preferably the sliding of the control piston); and whereby when a second, higher given pressure is attained a second pressure medium flow path is opened to direct the pressure medium to an outlet connection (such as a nipple) and back to the tank, said second pressure medium flow path being activated by a further sliding of the valve element in the same direction.

With the above solution, the charging and relieving of the hydraulic accumulaor which occurs with bypass valves is avoided. In the system of this invention, the hydraulic accumulator acquires the character and function of a safety reserve. Since the pressure medium source must produce a pressure at least as high as the first limiting pressure, as long as there is no consumption in the primary loop, it is clear that circulation of the pressure medium in the unpressurized state is not possible. However, this condition is not important if the flow of the feed stream is small. Thus, it is quite normal with vehicular hydraulic devices for pumps with feed stream flow rates of 1 dm$^3$/min (cubic decimeters/ minute) or less to be used. The advantages achieved outweigh the small additional energy consumption.

Hydraulic sequence valves with turn-on valves or follower valves are themselves known, but with these sequence valves, a special pressure-limiting valve must be provided, as a result of which the number of necessary component parts in the system is practically doubled.

BRIEF DESCRIPTION OF THE DRAWING

The invention is illustrated in more detail with the aid of the embodiment shown in the drawing, wherein the embodiment is represented in part by means of hydraulic symbols.

DESCRIPTION OF THE PREFERRED EMBODIMENTS

A connecting piece 2 joined to a hydraulic accumulator 1 has sequential adjoining coaxial first through fifth bore holes 3 through 7, respectively, of different diameters. The diameter of first hole 3 is greater than that of second hole 4 which in turn is greater than that of third hole 5, and third hole 5 connects to fourth hole 6 and fifth hole 7, of successively greater diameter. In second hole 4, a control piston 8 is slidably mounted and is acted on by one end of a return spring 9 located in first hole 3. The counter support for the other end of return spring 9 is in a threaded cap 10 at one end of first hole 3 which is furnished with a centrally disposed outlet nipple T in the form of a tubing nozzle or the like. Control piston 8 has a central blind bore hole 12 which begins at piston end face 11 lying opposite to return spring 9 which connects at its end to the outer wall surface of control piston 8 via transverse holes 13. At a distance from the junction of third hole 5 and second hole 4, there is a ring-shaped groove 14 in and coaxial with second hole 4; the edge of groove 14 which is closest to third hole 5 is designated first control edge 15. A first consuming-device connection R is linked to groove 14. The shoulder edge on second hole 4 at the junction of first hole 3 and second hole 4 is designated second control edge 16. Third hole 5 is linked to a pressure connection P fed by a pressure medium source 17. The passage between third hole 5 and fourth hole 6 serves as a seat 18 for a check valve 19 which is acted on by a spring 20, which is guided in a cage 21 in the form of a sheet metal shaped piece. Fifth hole 7 has the shape of a shallow countersinking. Through junction opening 22, fifth hole 7 is linked to liquid space 23 of hydraulic accumulator 1 which has a membrane 25 which is furnished with a closing piece 24 and which separates liquid space 23 from a gas space 26. A conduit 27 leads from hole 7 to a second consuming-device connection A, to which the primary (preferential) loop containing power brake device 28 is connected. The power brake has a closed center position whereby it consumes pressure medium only when actuated and only in small amounts. A secondary (non-preferential) loop 33 is connected at first consuming device connection R, which loop has a level-regulating valve 29 for regulating the height of an axle 32 which is sprung with the aid of piston-and-cylinder assembly 30 and hydraulic accumulator 31.

Level-regulating valve 29 has a center switching position for unpressurized circulation, which position corresponds to the height desired.

To illustrate the operation of the system, assume that the pressure medium source 17 is delivering and that the hydraulic accumulator 1 is still not sufficiently filled. The pressure medium then passes through pressure connection P, third hole 5, check valve 19, fourth hole 6, fifth hole 7, and junction opening 22 into liquid space 23, which space constantly enlarges as it is being filled. As long as there is no consumption in the power brake, the pressure quickly attains a value corresponding to the potential or prestressing force of return spring 9. When the pressure increases further, the pressure force on piston end face 11 and the bottom of blind hole 12 exceeds the prestressing force of return spring 9, and control piston 8 begins to move away from the pressure (downward in the FIGURE). When a given amount of pressure is attained, first control edge 15 is passed, and a passage is opened from the hydraulic fluid pressurized part of second bore hole 4 to ring-shaped groove 14, and thus through first consuming-device connection R to the secondary loop 33. The pressure at first control edge 15 does not increase further as long as no higher pressure is needed in the secondary loop 33. If, however, a higher pressure is produced in the secondary loop 33 due to overloading or closing of outlet passages or the like, the pressure increase is also transmitted to end face 11 and the bottom of blind hole 12 and it causes a further (downward) movement of control piston 8, which will continue until, at a second given pressure, the transverse holes 13 move past second control edge 16. Beyond this point, there is a passage from second bore hole 4 through blind bore hole 12, transverse holes 13, and first bore hole 3, to outlet nipple T, so that pressure medium source 17 is linked to the outlet.

The design engineer has the freedom to make the difference between the first and second given pressures small. Since each pressure increase also makes itself felt in the primary loop, the uniform pressure properties which are desirable for the system will be better, the smaller one makes the difference in given pressures. Since the first given pressure is adequate for supplying the primary loop, a demand there does not lead to emptying of the hydraulic reservoir but rather is immediately met via the pressure medium source 17. It should be noted that control piston 8 is not pressurized on its spring side. This means that the pressure drop at control edge 15 is proportionally greater the less the required pressure in the secondary loop. If, however, the required pressure in the secondary loop is at the level of the first given pressure, there is practically no pressure drop at control edge 15, and the energy balance is very favorable. On the other hand, the energy loss with small pumps is negligible in any event.

The invention is not limited to the embodiment represented. It is clear that the configuration of the control piston is variable within wide limits, particularly with regard to its interaction with channels or holes in the housing. Thus, in general, holes and channels are interchangeable and may be located at differing points. It is, of course, important that the holes in the control piston not be located so that all loops of fluid pressure medium are interconnected simultaneously, unless it is desired that the hydraulic priority valve operates as a simple on-off valve. Thus, in the preferred embodiment illustrated in the drawing, transverse holes 13 cannot pass second control edge 16 until after end face 11 passes first control edge 15. The location and orientation of connections are also discretionary. Finally, the entire priority switch system may be accommodated in a housing comprising a single structural module.

I claim:

1. In a hydraulic priority valve for preferential feeding of a low consumption primary loop in fluid communication with a hydraulic accumulator which is chargeable from a pressure medium source via a flow control means, against a non-preferential secondary loop which can be switched in with the aid of said priority valve when said primary loop is sufficiently pressurized, said hydraulic priority valve having protecting means for protecting both loops from excess pressure comprising a pressure-limiting valve which functions to make an outlet flow path available when pressure is excessive;

the improvement wherein the priority valve is a sequence valve in a structural module with the pressure-limiting valve, having a valve element means with a hydraulic fluid interface surface which valve element means acts against the force of a resistance means, said valve element means being permanently pressurized from the pressure medium source, whereby when a first given pressure is attained a first pressure medium flow path is opened from a pressure connection which is upstream of the flow control means to a first consuming device connection which is linked to the secondary loop, said first pressure medium flow path being activated by the movement of the valve element means, whereby when a second higher given pressure is attained a second pressure medium flow path is opened by a valve member acted upon by the pressure medium, to direct the pressure medium to an outlet connection and back to the tank, said second pressure medium flow path being activated by a further movement of the valve element means in the same direction, and whereby after at least the first given pressure is attained, the valve element has been moved sufficiently to permit a permanent link between the pressure medium source and the first consuming device connection so that when the second given pressure is attained the secondary loop is linked to said outlet connection in addition to being linked to the primary loop; and wherein the flow control means is a check valve, the valve element means is a slideable control piston having an end face opposite to the resistance means which is a return spring, the hydraulic interface surface comprising at least said end face in the control piston, and the pressure medium is hydraulic fluid; whereby when the first given pressure is attained, the end face passes a first control edge and as a result opens up a flow path from a second bore hole which accommodates the control piston and a third bore hole which is connected to the pressure medium source, to a ring-shaped groove located in the second bore hole which is linked to a first consuming-device connection; whereby an inner blind hole extending inwardly from the end face into the control piston is linked via transverse hole means to the outer surface of the control piston at the bottom of the inner blind hole, so that when the second given pressure is attained, the transverse hole means moves into fluid communication with a first bore hole which is linked to the outlet connection.

2. In a hydraulic priority valve for preferential feeding of a low consumption primary loop in fluid communication with a hydraulic accumulator which is chargeable from a pressure medium source via a flow control means, against a non-preferential secondary loop which can be switched in with the aid of said priority valve when said primary loop is sufficiently pressurized, said hydraulic priority valve having protecting means for protecting both loops from excess pressure comprising a pressure-limiting valve which functions to make an outlet flow path available when pressure is excessive;

the improvement wherein the priority valve is a sequence valve in a structural module with the pressure-limiting valve, having a valve element means with a hydraulic fluid interface surface which valve element means acts against the force of a resistance means, said valve element means being permanently pressurized from the pressure medium source, whereby when a first given pressure is attained a first pressure medium flow path is opened from a pressure connection which is upstream of the flow control means to a first consuming device connection which is linked to the secondary loop, said first pressure medium flow path being activated by the movement of the valve element means, and whereby when a second higher given pressure is attained a second pressure medium flow path is opened by a valve member acted upon by the pressure medium, to direct the pressure medium to an outlet connection and back to the tank, said second pressure medium flow path being activated by a further movement of the valve element means in the same direction; and wherein the flow control means is a check valve, the valve element means is a slideable control piston having an end face opposite to the resistance means which is a return spring, the hydraulic interface surface comprising at least said end face in the control piston, and the pressure medium is hydraulic fluid; whereby when the first given pressure is attained, the end face passes a first control edge and as a result opens up a flow path from a second bore hole which accommodates the control piston and a third bore hole which is connected to the pressure medium source, to a ring-shaped groove located in the second bore hole which is linked to a first consuming-device connection; whereby an inner blind hole extending inwardly from the end face into the control piston is linked via transverse hole means to the outer surface of the control piston at the bottom of the inner blind hole, so that when the second given pressure is attained, the transverse hole means moves into fluid communication with a first bore hole which is linked to the outlet connection.

3. The improvement of claim 1 or 2 wherein the bore holes are coaxial and are in numerical sequence; the first bore hole contains the return spring; the second bore hole contains the control piston, and has the ring groove and first consuming device connection with first control edge; the third bore hole has the pressure connection; and the fourth bore hole has the check valve at the junction point with the third bore hole.

4. The improvement of claim 3 wherein the junction point between the first bore hole and the second bore hole forms the second control edge, so that when the control piston moves sufficiently, the transverse hole means passes the second control edge and fluid flow is opened between the first bore hole and the second bore hole.

5. The improvement of claim 4 wherein one end of the return spring is seated in a cap on the end of the first bore hole opposite the junction with the second bore hole, the other end engaging the control piston, said cap having the outlet connection therein in the form of a nipple.

6. The improvement of claim 5 wherein all of the bore holes are located in a single structural module.

7. The improvement of claim 6 wherein the primary loop contains a vehicular power brake device.

* * * * *